July 31, 1962 K. MAERTENS ET AL 3,046,679
FOOTWEAR WITH BOTTOM SOLES MADE OF ELASTIC MATERIAL
Filed May 23, 1957 2 Sheets-Sheet 1
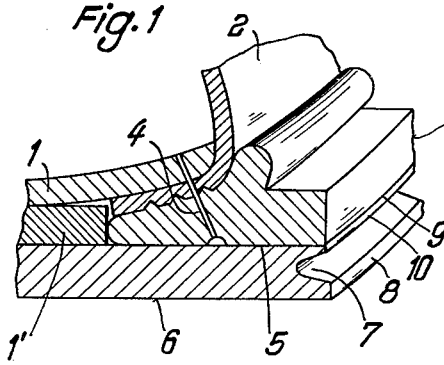
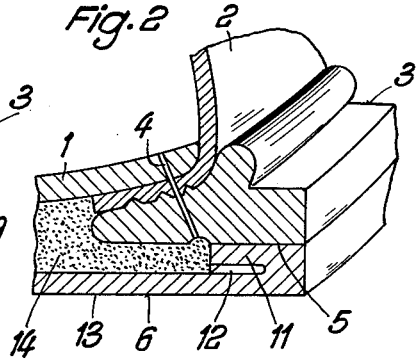
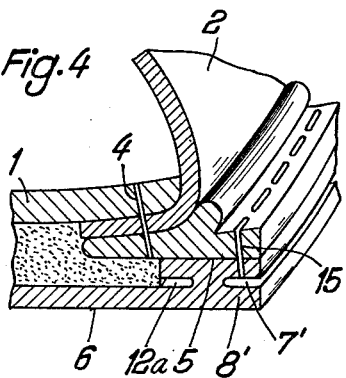
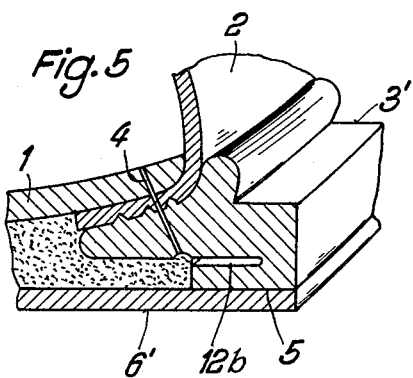
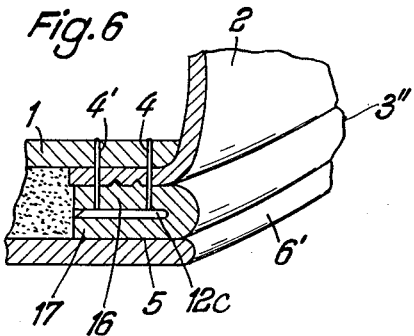
Inventors
K. Maertens
H. Funck
H. Götz July 31, 1962   K. MAERTENS ET AL   3,046,679
FOOTWEAR WITH BOTTOM SOLES MADE OF ELASTIC MATERIAL Filed May 23, 1957   2 Sheets-Sheet 2

Inventors
K. Maertens
H. Funck
H. Götz
Dr. Hancock Downing Seibold Attys.

3,046,679
FOOTWEAR WITH BOTTOM SOLES MADE OF ELASTIC MATERIAL
Klaus Maertens, St. Heinrich Strasse, Seeshaupt, Germany; Herbert Funck, 83 Planegger Strasse, Munchen-Pasing, Germany; and Heinrich Götz, 7 Farberstrasse, Augsburg, Germany
Filed May 23, 1957, Ser. No. 661,199
4 Claims. (Cl. 36—17)

This invention relates to footwear with a bottom sole which is made of elastic material and is connected to the upper or to the welt thereof, or to both, by glueing or welding over a surface.

In footwear of the above mentioned kind, provided with bottom soles made of plastic, rubber or rubber-like material which is elastic, it is difficult to make the glueing or welding seam strong enough to ensure that the bottom sole, more especially the outer edge of the bottom sole, will adhere satisfactorily to the upper when violent stresses occur. It very often happens that after the shoe has been in use only for a short time the glueing or welding breaks, beginning at the outer edge portion, and splitting at the glueing or welding surface continues so that the bottom sole detaches itself to a greater or lesser extent from the upper.

Attempts have been made the remove this disadvantage by developing particularly strongly adhesive glues and by improving the welding technique; but up to the present time it has not been possible to make the connection strong enough to stand the unavoidable occasional stresses which occur.

The object of the invention is to make the glued or welded connection between the bottom sole and the upper stronger. The invention consists essentially in this, that at least one of the two parts glued or welded together, that is to say either the welt or the bottom sole connected to the welt, is slotted or grooved at a preferably short distance from the edge of the glueing or welding surface, in a plane extending substantially parallel to this surface.

The slotting or grooving of one or both of interconnected parts fundamentally changes the stress distribution over the glueing or welding surface. If both parts are made in the usual way with vertical peripheral edges and simply glued one on to the other, then for instance a lateral thrust on the free lower edge of the elastically deformable bottom sole results in a tensile stress mainly affecting the edge of the glueing or welding surface and decreasing rapidly towards the interior, and this stress, in addition to the shearing stress occurring at the connection surface, produces a normal stress at this surface tending to bring about a cleavage at the glueing or welding surface and to pull the two interconnected parts away from one another. This normal stress occurs more particularly when the wearer of the shoe trips over an obstacle and catches the bottom sole on it, and the edge portion of the bottom sole is pulled away from the connection surface in a direction substantially perpendicular to that surface.

The effect of the slots or grooves which in accordance with the invention are provided a short distance away from the edge of the glueing or welding surface and in a plane substantially parallel to that surface, is that the normal tensile stresses at the connection surface instead of reaching their maximum value at the edge of this surface and decreasing rapidly towards the interior, are more uniformly distributed over a very wide edge strip of this connection surface, their maximum value occurring further in towards the inner region of the surface. This very substantially reduces the danger of splitting the connection.

It has been found in practice that greater elasticity of the bottom sole gives rise to a greater risk of splitting at the connection surface. It is therefore advisable, more particularly in the case of rubber bottom soles, to make in the substantially vertical outer edge surface of the bottom sole a peripheral groove which either extends round the whole outer edge of the bottom sole or else is provided at least at those parts of the bottom sole edge where the glueing or welding seam is found in practice to break most readily.

In certain cases the groove may be made very narrow, i.e. in the form of a slit; in other cases, more particularly where the groove is not made until after the sole has been glued or welded on, the groove may be made wide, and rounded at the bottom, in order to prevent the occurrence of excessive stresses at the bottom of the groove, which stresses might lead to breaking of the material at said bottom.

But the breaking of the connection between the bottom sole and the upper does not take place only at the outer edge of the shoe; in shoes with air cushion soles, it can also take place on the inside of the connection, or joint, if an interspace, which may be filled with an elastic material and of which the height is determined mainly by the height of a peripheral thicker edge portion of the bottom sole or by the height of the welt, or by both, is present between a bottom sole, which is glued or welded to the welt of the upper only along an edge strip, and the insole. At each step the resilient action of the elastic material or of the air in the interspace produces a great stress on the inner edge of the welding or glueing surface, since the centre of the bottom sole, although pressed hard against the glueing surface whenever the air cushion or elastic cushion is compressed, is nevertheless pushed downwards by the cushion whenever the load is taken off.

Up to the present time, in footwear of this kind the welt and the bottom sole formed as an air cushion sole or hollow sole have been made of thermoplastic synthetic material, and the welt and the bottom sole have been interconnected by welding. The advantage of the use of thermoplastic material lies in the strong connection between the parts that can be produced by welding, and also in the light weight, great flexibility and high resistance to wear of such material.

A disadvantage of bottom soles made of thermoplastic material, which of course usually becomes apparent only in the case of working footwear, is the low heat resistance of thermoplastic material. When shoes with soles made of thermoplastic material are worn by persons working under very hot conditions the bottom soles can easily be destroyed by the heat.

An obvious idea, therefore, is to use for the elastic chamber system of the bottom part of the shoe—i.e. for the welt and bottom sole—materials which on the one hand are sufficiently elastic but on the other hand are substantially more heat-resistant than the thermoplastics heretofore used as bottom sole material. Materials that suggest themselves for this purpose are synthetic rubber with high resistance to heat, or synthetic resins that are strongly resistant to high temperatures and nevertheless very elastic. These materials, however, are mostly non-weldable; consequently they have to be interconnected by glueing. Glueing calls for a substantially broader attachment surface than does welding, since the adhesive strength of the known glues is far less than the strength of a weld seam.

A series of tests has shown that by widening the connection surface between the welt and the bottom sole, which of course can only be effected by extending the edge strip, which forms the glueing surface, towards the inner part of the bottom sole, so much of the space available as an air cushion chamber inside the shoe bottom is taken up, and the wall thicknesses of the parts laterally bounding the chamber are increased to such an extent, that the advantageous elastic characteristics of the air-cushioned shoe bottom are mostly lost.

The present invention makes it possible to provide a sufficiently wide glueing surface and nevertheless to make profitable use of the elasticity of the sole wall or of the welt, so that the advantageous mobility of the bottom sole relatively to the insole and also the elastic characteristics of the air cushion inside the shoe bottom—and also the pump action which is associated therewith and which produces an air movement in the shoe bottom—are maintained.

According to a further feature of the invention, in footwear of this kind with air cushion soles, slit-shaped grooves are provided which extend outwards from the interspace into the thicker edge portion of the bottom sole, or into the welt, or into both.

In the case of very strong welded connections, which in general can be produced only if the welt and the bottom sole are made of similar materials, the depth of the slots or grooves should be made such that the sectional area of the grooved part, reduced by the grooves, is about one half as great as the surface of the weld seam. In the case of glued connections, of which the adhesive strength is usually substantially less than that of welded connections, it is advisable to make the grooves extend still further into the material, so that the sectional area of the grooved part is reduced to about one third of the surface which serves as glueing surface.

To prevent the grooves from giving rise to any substantial differences in the pressure exerted on the glueing or welding surface during the glueing or welding process, according to a further feature of the invention the grooves, that is to say at least the inner grooves, which must necessarily be provided before the bottom sole is glued or welded on, are formed as narrow slits of which the bottom, however, is rounded. Such narrow slits easily close up under pressure when the parts being glued or welded are pressed together, so that the pressure on the glueing or welding surface is approximately the same at all points.

In the case of slits that are made in both sides of the material of the welt or of the peripheral thicker edge portion of the bottom sole, it is advisable that the part of the sectional area reduced by the grooves should be situated approximately in the central portion of the thicker edge portion of the sole, or of the frame.

Footwear exposed to very high mechanical stresses, for instnace working, marching or walking boots, can be further improved by connecting the outer edge of the sole to the welt by additional attachment means, for instance stitching, which are preferably so disposed that they extend from the upper side of the groove provided in the outer edge of the bottom sole. In this position the attachment means or the threads of the stitching are very well protected against damage.

In the case of light footwear provided with an air cushion sole, a construction has been found advantageous in which the welt of the shoe is formed by a flat compact member having a U-shaped cross-section open towards the inside of the shoe, the upper arm of this member being secured to the upper while the lower arm is glued or welded to the bottom sole of the shoe.

It has been found in practice that separation of the sole from the upper usually occurs only in certain regions, more particularly in the front part of the shoe, and occurs less often in the region of the instep or of the heel. In air cushion shoes there is a danger that the glued or welded joint may break from the inside, more particularly in the region of the ball part of the shoe. Consequently, in light footwear in most cases the slits or grooves need only be provided in the region of the ball part of the shoe.

Embodiments of the invention chosen by way of example are illustrated in the accompanying drawings, in which:

FIGURE 1 is a vertical cross-section through the welt part of a shoe with a bottom sole glued or welded to the welt which is made wide;

FIGURE 2 is a similar section through the welt part of a modified shoe provided with an air cushion sole;

FIGURE 4 shows a modified form of welt connection similar to FIGURE 2; and

FIGURES 5 and 6 show further modified forms of welt connection for shoes with air cushion soles.

Figure 3:
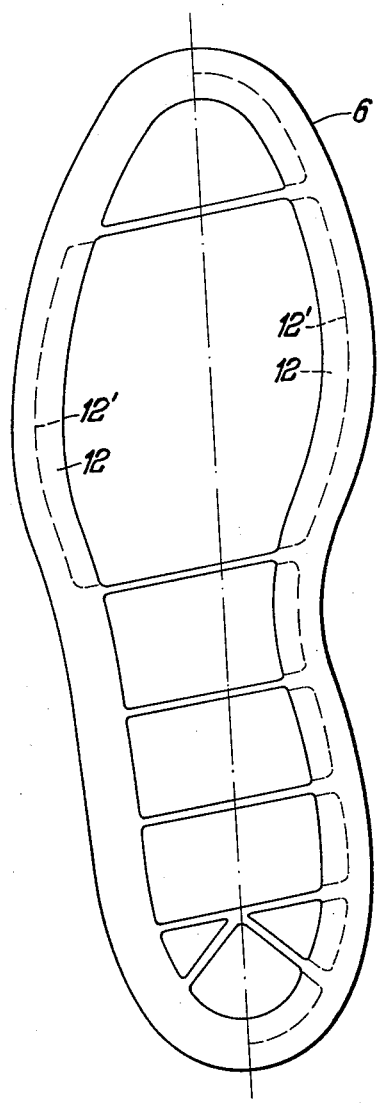
FIGURE 3 is a plan view of the inside of a bottom sole as used in a shoe having the features shown in FIGURE 2.

In all the forms of welt connection illustrated in the drawings, the insole 1 is connected to the upper 2 and the welt 3 by single or double-stitching 4. The welt 3 has on its bottom side a flat glueing or welding surface 5, to which the bottom sole 6, made of elastic material, is glued or welded.

In FIGURE 1, the bottom sole 6 is glued to the welt 3. The connection surface extends over the whole width of the welt 3. An intermediate sole 1' known per se is interposed between the bottom sole 6 and the insole 1. A groove 7 is made in the vertical outer edge surface of the bottom sole 6; this groove is disposed at a distance from the outer edge of the glueing or welding surface 5 and in a plane extending substantially parallel to this surface. By means of the groove 7 a thrust coming at an inclination from above or from the side and acting on the lower edge 8 of the bottom sole 6 is prevented from producing an excessively high normal stress in the outer edge of the glued part 5. The tensile stresses acting perpendicularly to the glueing surface (normal stresses) will be at their greatest approximately in the centre of this glueing surface; at its outer edge 9 only relatively small stresses can occur, since the upper lip 10 of the bottom sole edge cannot transmit high normal stresses. Consequently, the danger of a rupture of the glueing seam beginning at its outer edge is very substantially reduced.

It is advisable to arrange the groove 7 relatively close underneath the glueing surface 5, so that thrusts or stresses striking the sole edge at an inclination from above or from the side will not strike the lip 10; instead, such thrusts are to be taken up by the lower lip 8.

The welt connection illustrated in FIGURE 2 comprises a weld connection designed for a shoe with an air cushion sole. A slit-shaped groove 12 extending from the interspace or spacing between the insole and the bottom sole is provided in the thicker edge portion 11 of the bottom sole. More particularly, the bottom sole is provided with an upstanding marginal portion extending inwardly toward the interspace or spacing, and terminating a distance inwardly from the inward edge of the welt. This portion is welded to the outer edge portion of the welt 3. The groove 12 is made very narrow and is rounded at its bottom, and it extends so far into the thicker edge portion 11 of the bottom sole 6 that the intact part of the sectional area of the thicker edge portion 11 is less than one half of the connection surface 5. The groove 12 is made so narrow that it completely closes under pressure when the bottom sole 6 is pressed against the welt 3, so that the welding pressure applied after the material has been heated is distributed substantially uniformly over the whole connection surface.

After welding has been completed, i.e. when the welding pressure also ceases, the groove 12 opens again. The lower sole surface 13 of the bottom sole 6 can then oscillate freely over a relatively great width when the air cushion between the insole 1 and the bottom sole 6 is periodically loaded and freed from load. The tensile stresses in the weld seam 5 due to the pressure of the cushion filling 14 do not act on the inner edge of the weld seam, but have their maximum value approximately in the centre of the connection surface whereas only slight tensile stresses are present at the inner edge where large tensile stresses would be dangerous.

FIGURE 3 shows a complete bottom sole 6 as used in a shoe in which the welt connection is made as in FIGURE 2. FIGURE 3 is a plane view of the inside of the bottom sole 6. In the right hand side of FIGURE 3 the groove 12, of which the boundary 12' shows the depth of the groove, is made in the thicker edge portion of the bottom sole and extends outwards into said portion, and runs around the whole of the interspace or cavity of the bottom sole; said groove may for instance be formed in the bottom sole by pressure if the bottom sole is made by a pressing process.

In the left hand side of FIGURE 3 this groove is provided only in the region of the ball portion, since the greatest stresses on the connection between welt and bottom sole arise in this region owing to the "pumping" of the air cushion filling.

FIGURE 3 clearly shows how much the sectional area of the thicker portion of the bottom sole is reduced as compared with the connection surface between the bottom sole and welt.

FIGURE 4 shows a welt connection in which a respective groove is provided both on the inside and also on the outside of the bottom sole cavity. In this case the outer groove 7' is made relatively narrow, since this groove has already been formed in the sole during the manufacture thereof, and a wide or widely opened groove (such as is shown for instance in FIGURE 1) would impair uniform pressure distribution over the connection surface 5 during the glueing or welding process. This drawing also shows additional stitching 15 interconnecting the outer edge of the bottom sole 6 and the outer edge of the welt 3 and extending from the upper side of the groove 7'.

FIGURE 5 shows that the deep narrow grooves 12 can also be made in the welt part; this greatly simplifies the making of such grooves, since the welt 3' can be made by an extrusion process giving it any required cross-sectional shape, after which a straight extruded member is then made up into an elastic closed welt by being bent up and welded. The bottom sole 6' is in this case merely a completely flat sole without any thicker edge portion.

The welt assembly shown in FIGURE 6 comprises a welt 3" having a flat compact U-shaped cross-section. The upper arm of this U-shaped section member is firmly stitched to the upper leather 2 and the insole 1 by means of two sets of stitches 4 and 4'. The lower arm 17 is firmly glued or welded to the flat bottom sole 6' at the connection surface 5.

It is immediately clear from all the drawings that the manufacture of the shoe having the new welt connection presents no technical difficulties. In this connection it is to be observed that the welt is made of elastic material, i.e. material which can be subjected to great temporary deformation. Both the additional reinforcing stitching 15 in FIGURE 4 and also the upper stitching 4 and 4' in FIGURE 6 can be made easily and conveniently if the part of the bottom sole (lower lip 8', or the lower arm 17 of the U-shaped welt 3") that subsequently covers this stitching is bent away when the stitching is being made. It is advisable to make the inner groove 12, 12a, 12b, or 12c extremely narrow, in view of the compression of the parts during the welding or glueing process, but there is no reason why the outer groove 7 or 7' provided on the bottom sole edge should not be made even wider if, as mentioned previously, this groove is not made until after the sole has been welded or glued on. In that case this groove could also have for instance a semicircular cross- sectional shape, which in practice entirely removes any danger of the bottom sole material breaking at the bottom of the groove.

What is claimed is:

1. An article of footwear comprising an upper, an insole, an elastic welt member having a flat undersurface, means securing the upper, insole and welt together, an elastic bottom sole member having a flat marginal surface bound to the undersurface of the welt member, said insole, welt and bottom sole members defining a spacing between the insole and the bottom sole member, a cushion element arranged in said spacing, one of said members having a deep slot-shaped groove of narrow width and greater depth than width spaced a distance from said undersurface and substantially parallel thereto, said groove remaining permanently open and extending over at least the region of the ball portion of the article so that stresses tending to break the connection between the flat surfaces at the edge of the connection adjacent to the groove are transferred through the body of the member having said groove towards the inner region of the surfaces.

2. An article of footwear comprising an upper, an insole, a thermoplastic welt having a flat undersurface, means securing the upper, insole and welt together, a thermoplastic bottom sole having a flat marginal surface welded to the undersurface of the welt, said insole, welt and bottom sole defining a spacing between the insole and the bottom sole, a resilient cushion substantially filling the spacing, the welt having a deep slot-shaped groove of narrow width and greater depth than width spaced a distance from its undersurface and parallel thereto, said groove remaining permanently open towards said spacing and extending over at least the region of the ball portion of the article so that stresses tending to break the connection between the flat surfaces at the edge of the connection adjacent to the groove are transferred through the body of the welt towards the inner region of the surfaces.

3. An article of footwear comprising an upper, a thermoplastic welt having a flat undersurface, means securing the upper, insole and welt together, an elastic bottom sole having a flat marginal surface welded to the undersurface of the welt, said insole, welt and said bottom sole defining a spacing between the insole and the bottom sole, a resilient cushion substantially filling the space, the bottom sole having an upstanding marginal portion extending inwardly towards said spacing and terminating a distance from the inward edge of said welt, said upstanding marginal portion defining a deep slot-shaped groove of narrow width and greater depth than width spaced a distance from said undersurface and substantially parallel thereto, said groove remaining permanently open towards said spacing and extending over at least the region of the ball portion of the article so that stresses tending to break the connection between the flat surfaces at the edge of the connection adjacent to the groove are transferred through the upstanding marginal portion of the bottom sole towards the inner region of the surfaces.

4. The article of footwear as claimed in claim 1, in which said upstanding marginal portion of the bottom sole is provided with a deep slot-shaped groove of narrow width and greater depth than width lying diametrically opposite said first-named groove and said latter groove remaining permanently open towards the outside of said upstanding marginal portion.

References Cited in the file of this patent

UNITED STATES PATENTS

| | | |
|---|---|---|
| 712,437 | Schermerhorn | Oct. 28, 1902 |
| 1,406,033 | Kingston | Feb. 7, 1922 |
| 1,573,528 | Sorensen | Feb. 16, 1926 |
| 2,008,916 | Burgio | July 23, 1934 |
| 2,131,375 | Holland | Sept. 27, 1938 |

(Other references on following page)

UNITED STATES PATENTS

| | | | |
|---|---|---|---|
| 2,174,647 | Wiessner | Oct. 3, | 1939 |
| 2,299,831 | Lyon | Oct. 27, | 1942 |
| 2,311,630 | Ayers | Feb. 23, | 1943 |
| 2,381,937 | Supple | Aug. 14, | 1945 |
| 2,383,585 | Bindner | Aug. 28, | 1945 |
| 2,397,316 | Horvit | Mar. 26, | 1946 |
| 2,494,692 | Craven | Jan. 17, | 1950 |
| 2,559,609 | Foust | July 10, | 1951 |
| 2,916,834 | Shea | Dec. 15, | 1959 |
| 2,922,236 | Rubico | Jan. 26, | 1960 |

FOREIGN PATENTS

| | | | |
|---|---|---|---|
| 88,424 | Sweden | Feb. 2, | 1937 |
| 833,210 | France | July 18, | 1938 |
| 702,446 | Germany | Feb. 7, | 1941 |
| 537,561 | Great Britain | June 26, | 1941 |